(12) United States Patent
Pulido et al.

(10) Patent No.: US 9,578,393 B2
(45) Date of Patent: Feb. 21, 2017

(54) SYSTEMS AND METHODS FOR DETECTING AND ACTING ON EASTER EGGS HIDDEN IN MEDIA ASSETS

(71) Applicant: Rovi Guides, Inc., Santa Clara, CA (US)

(72) Inventors: Alejandro S. Pulido, Chatsworth, CA (US); Walter R. Klappert, Los Angeles, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/752,538

(22) Filed: Jun. 26, 2015

(65) Prior Publication Data

US 2016/0381434 A1    Dec. 29, 2016

(51) Int. Cl.
| | |
|---|---|
| *H04H 60/42* | (2008.01) |
| *H04N 21/81* | (2011.01) |
| *H04H 60/48* | (2008.01) |
| *H04N 21/234* | (2011.01) |
| *H04N 21/44* | (2011.01) |

(Continued)

(52) U.S. Cl.
CPC .......... *H04N 21/8133* (2013.01); *H04H 60/48* (2013.01); *H04N 21/23418* (2013.01); *H04N 21/4316* (2013.01); *H04N 21/44008* (2013.01); *H04N 21/4788* (2013.01); *H04N 21/4882* (2013.01); *H04N 21/6543* (2013.01); *H04N 21/8166* (2013.01); *H04N 21/858* (2013.01); *H04N 21/8545* (2013.01)

(58) Field of Classification Search
CPC ..................... H04N 21/8133; H04N 21/23418; H04N 21/4316; H04N 21/44008; H04N 21/4788; H04N 21/8545; H04N 21/858; H04N 21/4725

See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |

(Continued)

OTHER PUBLICATIONS

The Ramsacker, The Definiitive Source Guide to Secret Keys, Easter Eggs and Hidden Messages, Apr. 15, 1992, 1st Edition, pp. 1-28, http://apple2.org.za/gswv/USA2WUG/FOUNDING.MEMBERS/HOME.PAGES/SAM/GSGSKEEHM.html.*

(Continued)

*Primary Examiner* — Nathan Flynn
*Assistant Examiner* — Cynthia Fogg
(74) *Attorney, Agent, or Firm* — Ropes & Gray LLP

(57) ABSTRACT

Control circuitry may identify a media object in a frame of a media asset. Control circuitry may determine a frequency at which the media object occurs in other frames associated with the media asset. Control circuitry may compare the frequency to a threshold, and may determine, based on the comparing, that the frequency equals or exceeds the threshold. Based on determining that the frequency equals or exceeds the threshold, control circuitry may perform a search of a source external to a source of the media asset, where the search comprises searching for an indication that the media object comprises an Easter egg. Control circuitry may determine whether, based on the performing of the search, the indication was found, and, based on determining that the indication was found, execute a function relating to the Easter egg.

20 Claims, 4 Drawing Sheets

(51) Int. Cl.
*H04N 21/4788* (2011.01)
*H04N 21/6543* (2011.01)
*H04N 21/8545* (2011.01)
*H04N 21/858* (2011.01)
*H04N 21/488* (2011.01)
*H04N 21/431* (2011.01)

(56) References Cited

U.S. PATENT DOCUMENTS

| | | | |
|---|---|---|---|
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,620,769 B2 | 12/2013 | Yates | |
| 8,682,739 B1 | 3/2014 | Feinstein | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2007/0094679 A1* | 4/2007 | Shuster | G11B 27/329 725/31 |
| 2008/0307451 A1* | 12/2008 | Green | G06F 3/0482 725/25 |
| 2010/0058407 A1* | 3/2010 | LaFreniere | H04M 11/085 725/106 |
| 2010/0153885 A1 | 6/2010 | Yates | |
| 2011/0113444 A1* | 5/2011 | Popovich | G06F 17/3079 725/32 |
| 2012/0246685 A1* | 9/2012 | Fink | G06Q 30/02 725/60 |
| 2013/0194437 A1* | 8/2013 | Osman | H04N 5/2621 348/207.1 |

OTHER PUBLICATIONS

The Easter Egg Archive, "Gilmore Girls Easter Egg—Luke's Cell-Phone Number", Mar. 27, 2005, pp. 1-3, http://www.eeggs.com/items/43933.html.*

* cited by examiner

SYSTEMS AND METHODS FOR DETECTING AND ACTING ON EASTER EGGS HIDDEN IN MEDIA ASSETS

BACKGROUND

Objects with hidden meaning are often placed in media assets, such as television programs or movies. These objects are commonly referred to as "Easter eggs." An example of an Easter Egg is a telephone number in a frame of a media asset, where, if one were to call the telephone number, one would hear the voice of an actor from the media asset.

In order to identify an Easter egg in a media asset, a user must pay very close attention to each frame of the media asset, or consult resources, such as Internet blogs, to be told where to look to find an Easter egg. There is no known system or method for automatically alerting a user of an Easter egg in a given frame of a media asset.

SUMMARY

Systems and methods are provided herein for detecting and acting on Easter eggs hidden in a media asset. To achieve these ends, control circuitry may identify a media object in a frame of a media asset. Control circuitry may identify the media object using any known method, such as object recognition, facial recognition, optical character recognition, and the like. As an example, control circuitry may identify a telephone number in a frame of an episode of "Better Call Saul," a television program series, as a media object, using optical character recognition.

In some embodiments, control circuitry may determine a frequency at which the media object occurs in other frames associated with the media asset. For example, control circuitry may determine that the same telephone number occurs twice in the same episode of "Better Call Saul," and that it occurs ten times in the entire television series of "Better Call Saul."

In some embodiments, control circuitry may compare the frequency to a threshold. For example, a threshold of six may be set, indicating that it is likely that a media object is an Easter egg if it occurs six times in frames associated with the media asset (e.g., six times in a same television series, or in a same movie). As an example, the telephone number described above may repeat in advertisements as well as laundry tickets in an episode of "Better Call Saul."

In some embodiments, control circuitry may determine, based on the comparing, that the frequency equals or exceeds the threshold. Control circuitry may make this determination based on any known comparison operation. Based on determining that the frequency equals or exceeds the threshold, control circuitry may perform a search of a source external to a source of the media asset, wherein the search comprises searching for an indication that the media object comprises an Easter egg. For example, control circuitry may verify that the media object is in fact an Easter egg by consulting a database, blogs, social chatter, and the like for a confirmation that the media object is an Easter egg.

In some embodiments, control circuitry may determine whether, based on the performing of the search, the indication was found, and, based on determining that the indication was found, execute a function relating to the Easter egg. For example, if after scouring a blog, control circuitry found evidence that the media object is in fact an Easter egg, control circuitry may execute a function relating to the Easter egg. Potential functions include alerting the user to the existence of the Easter egg, and the like.

In some embodiments, control circuitry may identify a media object as an Easter egg when control circuitry determines that the media object has hidden meaning. Having hidden meaning may comprise having a meaning that is identified by means other than metadata embedded within the media asset or metadata obtained from a signal that provides the media asset. For example, having a hidden meaning may be identified by scouring social discussion forums, such as Reddit, to determine whether a media object has a meaning that is not apparent when one first glances at the media object. Examples of metadata embedded within the media asset or metadata obtained from a signal that provides the media asset include watermarks, vertical blanking interval (VBI) data, and the like.

In some embodiments, the media object may comprise at least one of textual data in the frame, a two-dimensional image in the frame, and a three-dimensional object in the frame. For example, the media object may be a two-dimensional picture in a frame of a media asset, or it may be textual data, like a phone number, or it may be a three-dimensional object in the frame of the media asset, like a teddy bear.

In some embodiments, when control circuitry is identifying the media object, control circuitry may execute an optical character recognition ("OCR") module to identify textual data in the frame. For example, if an image of a laundry tag is in a frame and includes a telephone number, control circuitry may execute an OCR module to learn each digit of the telephone number.

In some embodiments, control circuitry may determine that the media object is a telephone number. When control circuitry determines that an indication that the telephone number is an Easter egg exists, control circuitry may automatically dial the telephone number. For example, control circuitry may cause the telephone number to be dialed as if a human being had dialed the number, and receive an audio signal in response as if a second human had picked up the call when the number was dialed. Control circuitry may then determine whether voice data received based on dialing the telephone number is consistent with a voice of a character in the media asset. For example, in media asset series "Better Call Saul," the phone number described above may be listed on a luggage tag. When you dial that number, the voice of Saul, a character in the series, picks up. Control circuitry may determine by using a voice recognition engine that the voice is of the character Saul, and therefore would determine that the voice data received is consistent with that of a character in the media asset. Based on determining that the voice data is consistent with the voice of the character in the media asset, control circuitry may determine that the indication was found, and therefore that the media object is in fact an Easter egg.

In some embodiments, when control circuitry is executing the function, control circuitry may generate for display a prompt that identifies the Easter egg to a viewer. For example, following from the telephone number example above, control circuitry may, after determining that the telephone number on the laundry tag is an Easter egg, generate for display a prompt that explains that the telephone number is an Easter egg. The prompt may comprise a selectable option for performing a further function, and wherein the further function comprises at least one of: dialing a telephone number, generating for display additional information about the Easter egg, and generating for display a selectable shortcut that, when selected, causes a frame in which a second instance of the Easter egg appears to be generated for display. For example, if control circuitry receives a selection of the selectable option, control circuitry may dial the telephone number, display further information about the telephone number, like what would happen if one would dial it, and/or identify other times in the series "Better Caul Saul" when the telephone number exists.

In some embodiments, the source external to the source of the media asset comprises at least one of: an on-line discussion forum, a database comprising an identification of Easter eggs, and a voicemail provider. For example, control circuitry may search an on-line discussion forum, like Reddit, for an indication that the media object is an Easter egg.

In some embodiments, when control circuitry executes the function, control circuitry may initiate a chat portal by which a viewer of the media asset may communicate with other users on the topic of the Easter egg. For example, during a live broadcast of an episode of "Better Call Saul," control circuitry may generate for display a chat window where users who identified the Easter egg may share their thoughts about it.

In some embodiments, control circuitry may set the threshold based on at least one of: a length of the media asset, the number of other media assets associated with the media asset, and a type of the media asset. For example, if the media asset is a brief episode, the threshold may be a low threshold, like 1 or 2, versus for a long media asset or a media asset of a series of media assets, where a high threshold may be set.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
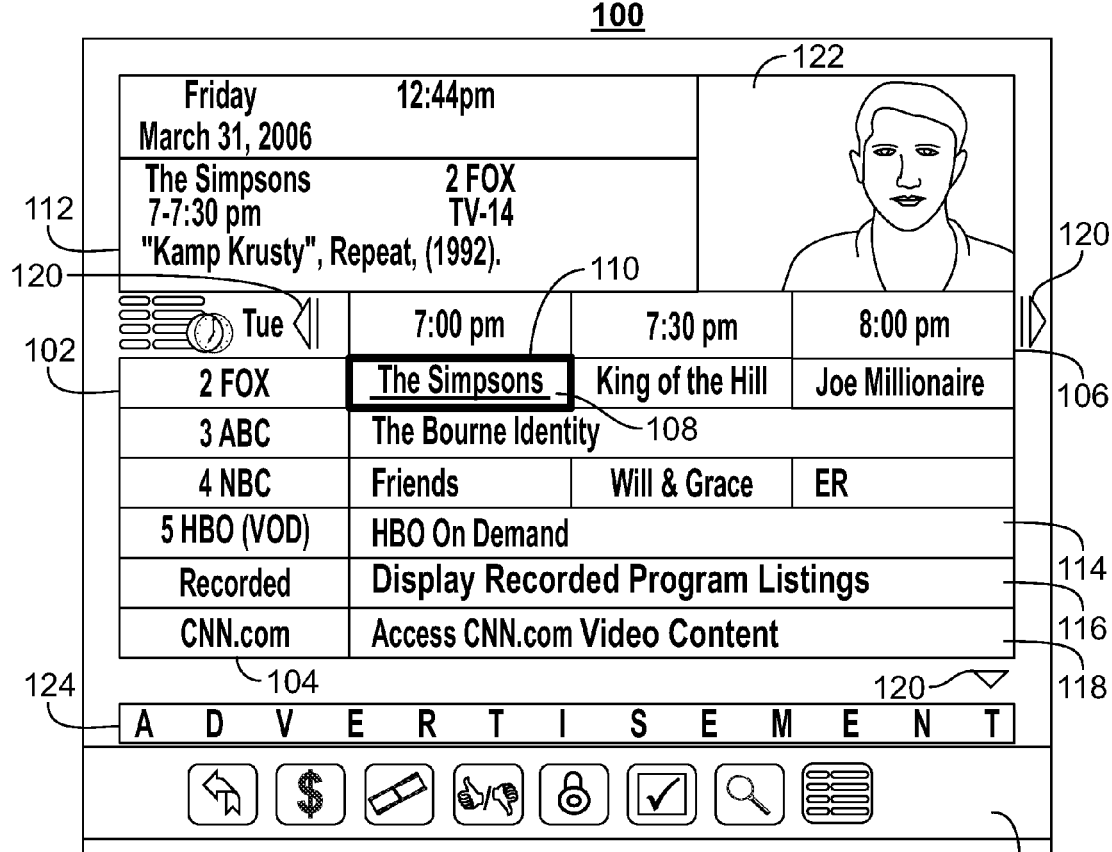
FIG. 1 shows an illustrative embodiment of a display screen that may be used to provide media guidance application listings and other media guidance information, in accordance with some embodiments of the disclosure.

Systems and methods are provided herein for detecting and acting on Easter eggs hidden in a media asset. To achieve these ends, control circuitry may identify a media object in a frame of a media asset. Control circuitry may identify the media object using any known method, such as object recognition, facial recognition, optical character recognition, and the like. As an example, control circuitry may identify a telephone number in a frame of an episode of "Better Call Saul," a television program series, as a media object, using optical character recognition.

In some embodiments, control circuitry may determine a frequency at which the media object occurs in other frames associated with the media asset. For example, control circuitry may determine that the same telephone number occurs twice in the same episode "Better Call Saul," and that it occurs ten times in the entire television series of "Better Call Saul."

In some embodiments, control circuitry may compare the frequency to a threshold. For example, a threshold of six may be set, indicating that it is likely that a media object is an Easter egg if it occurs six times in frames associated with the media asset (e.g., six times in a same television series, or in a same movie). As an example, the telephone number described above may repeat in advertisements as well as laundry tickets in the program "Better Call Saul."

In some embodiments, control circuitry may determine, based on the comparing, that the frequency equals or exceeds the threshold. Control circuitry may make this determination based on any known comparison operation. Based on determining that the frequency equals or exceeds the threshold, control circuitry may perform a search of a source external to a source of the media asset, wherein the search comprises searching for an indication that the media object comprises an Easter egg. For example, control circuitry may verify that the media object is in fact an Easter egg by consulting a database, blogs, social chatter, and the like for a confirmation that the media object is an Easter egg.

In some embodiments, control circuitry may determine whether, based on the performing of the search, the indication was found, and, based on determining that the indication was found, execute a function relating to the Easter egg. For example, if after scouring a blog, control circuitry found evidence that the media object is in fact an Easter egg, control circuitry may execute a function relating to the Easter egg. Potential functions include alerting the user to the existence of the Easter egg, and the like.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
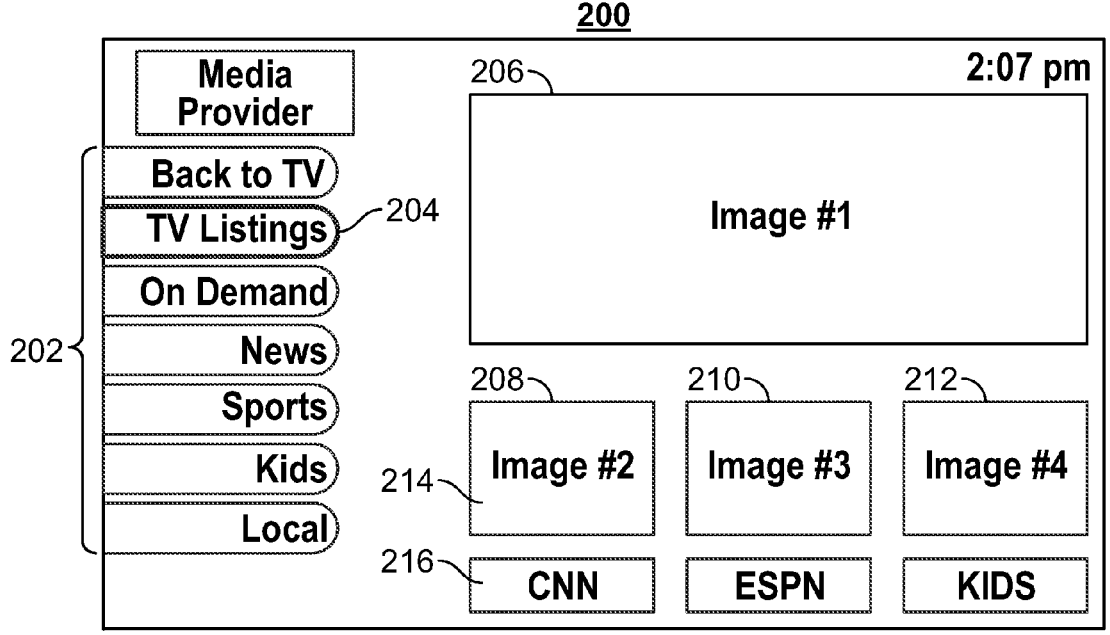
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
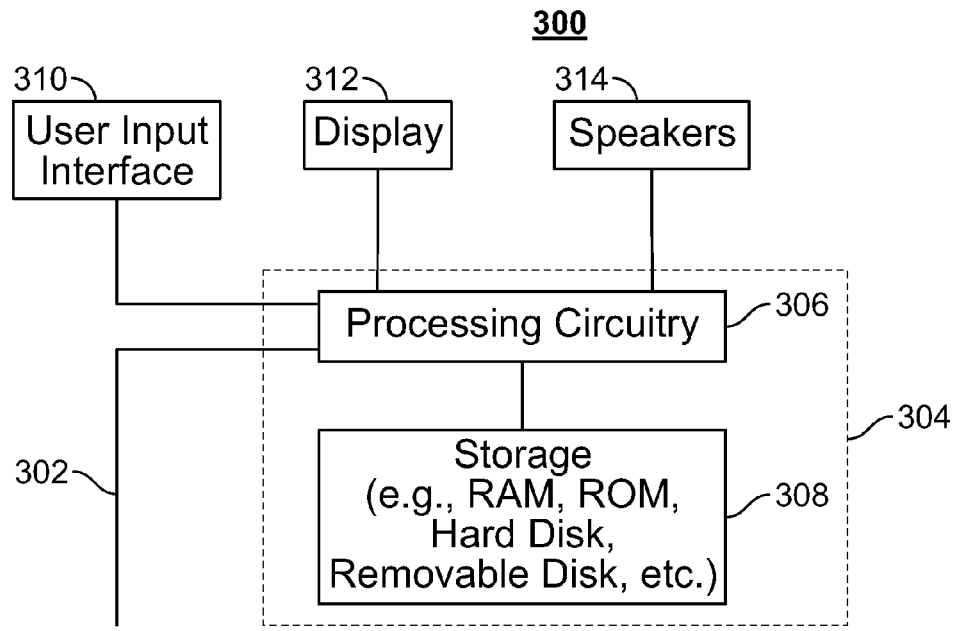
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
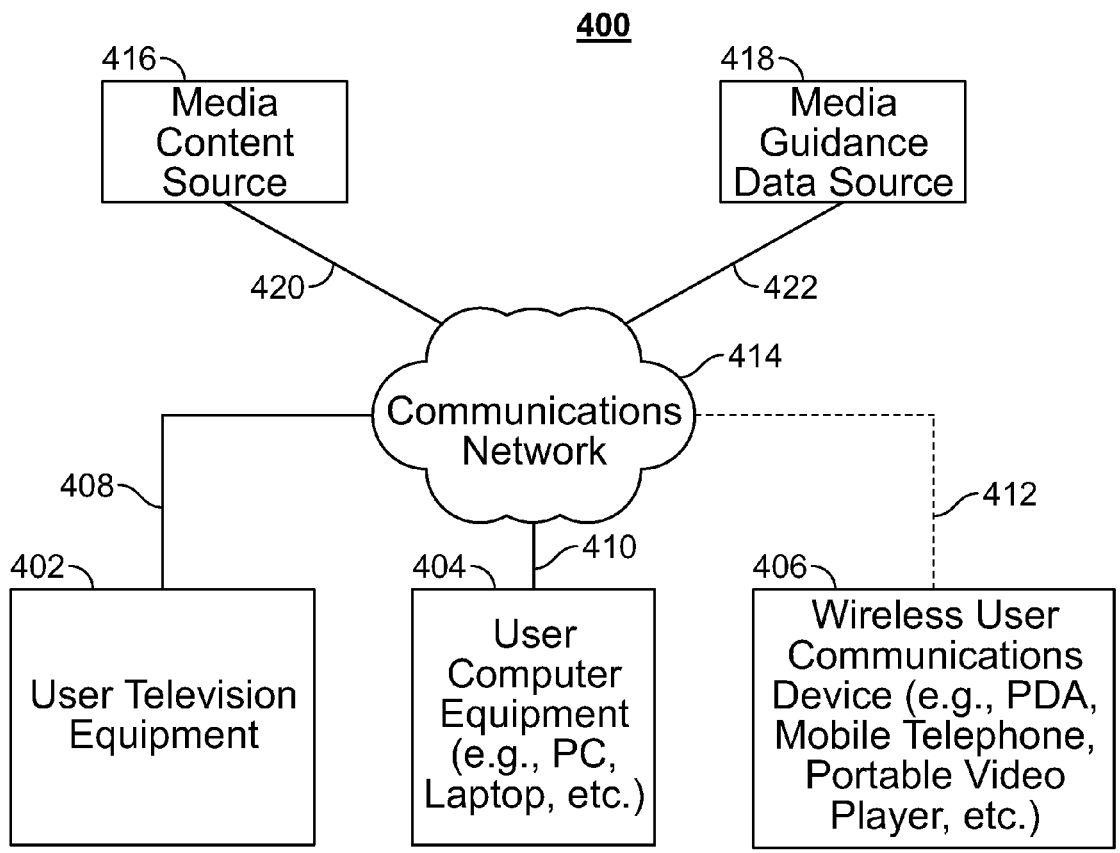
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
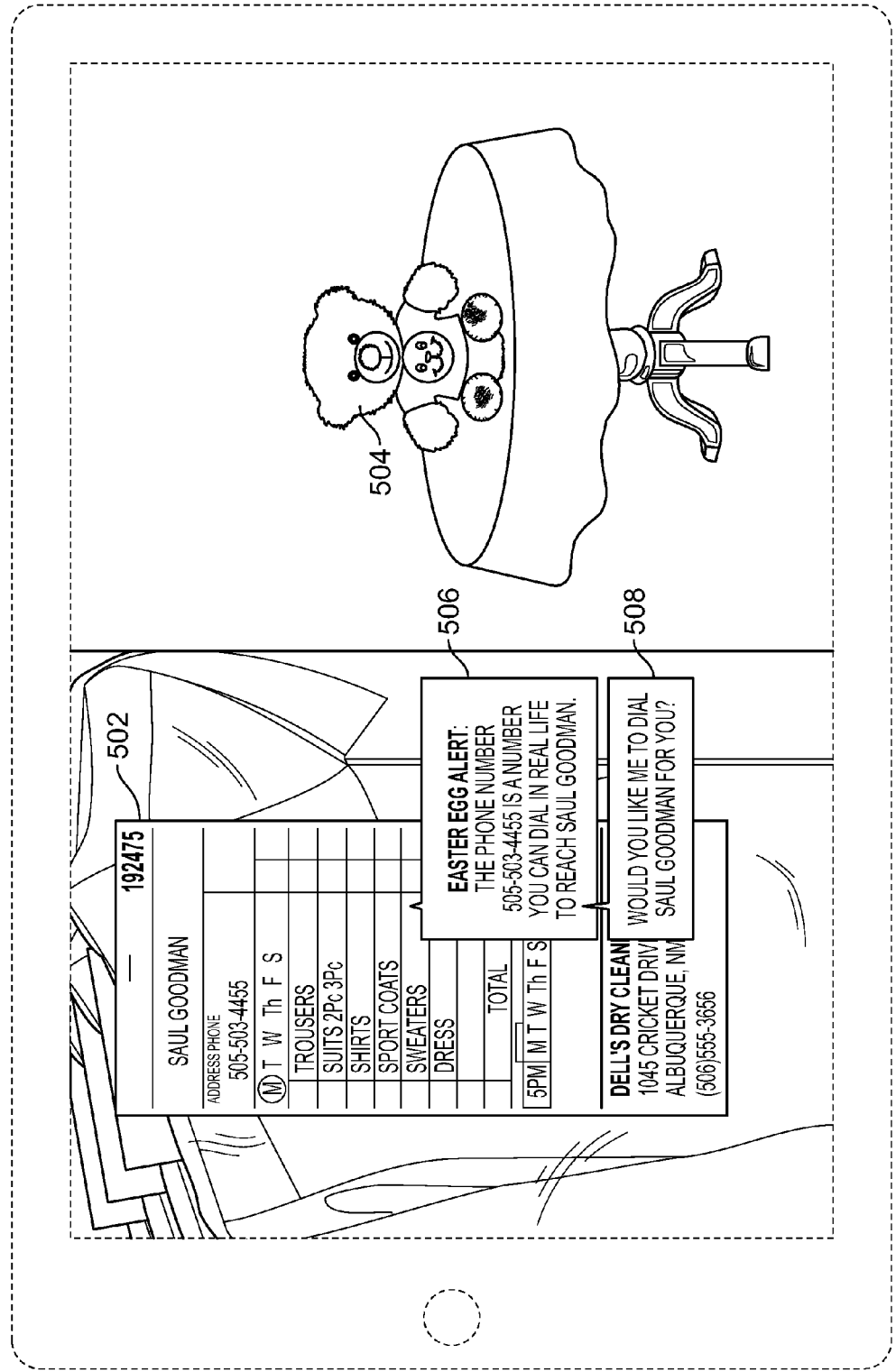
FIG. 5 shows an illustrative embodiment of a user equipment device on which an image, portions of images, media asset identifiers, and other information are displayed, in accordance with some embodiments of the disclosure.

FIG. 5 shows an illustrative embodiment of a user equipment device on which an image, portions of images, media asset identifiers, and other information are displayed, in accordance with some embodiments of the disclosure. FIG. 5 depicts user equipment 500. User equipment may have the functionality of any of user equipment 402, 404, or 406.

User equipment 500 may generate for display (e.g., through display 312) a frame of a media asset, as is depicted in FIG. 5. Depicted in the frame is a package of dry cleaning, including media object 502, which is a dry cleaning ticket. Media object 502 includes a telephone number. Also depicted in the frame is media object 504, which is a teddy bear. Each of media object 502 and media object 504 are media objects. Also depicted in FIG. 5 are alerts 506 and 508, which will be described in further detail below.

In some embodiments, control circuitry (e.g., control circuitry 304, implemented in user equipment 500) may identify a media object in a frame of a media asset. For example, control circuitry 304 may generate for display (e.g., on display 312) a frame of an episode of "Better Call Saul," as is depicted in FIG. 5. Control circuitry 304 may identify a media object in the frame, such as media object 502, or media object 504. Control circuitry 304 may identify the media object in any known manner, such as identifying the media object by an indication embedded in metadata of the media asset, or by employing an image recognition engine. In some embodiments, the media object may comprise audio accompanying a video frame. For example, if a character says "Call me at 505-503-4455," control circuitry 304 may identify the media object based on the audio data. Similarly, control circuitry 304 may parse and analyzed closed captioning data of a video asset to identify a media object, or may use speech-to-text or speech recognition to identify audio data that forms a media object in an effort to identify a media object.

In some embodiments, control circuitry 304 may determine a frequency at which the media object occurs in other frames associated with the media asset. As an example, control circuitry 304 may query a database (e.g., media guidance data source 418) to determine how many other instances the media object occurs in either the same episode of "Better Call Saul," the entire series of "Better Call Saul," or the entire series of related media asset series, such as "Breaking Bad," from which "Better Call Saul" was spun off. If media guidance data source 418 is not available, control circuitry 304 may access each frame associated with the media asset and apply any known media object identification technique, such as analyzing metadata or employing an image recognition engine, to determine a frequency at which the media object appears in the frames associated with the media asset. As an example, a frequency may be low for certain objects, or even be set to 1 for objects that are highly likely to be Easter eggs, such as telephone numbers like the one in media object 502. The frequency may be high for more ubiquitous objects, such as stuffed animals like media object 504. It is unlikely that media object 504 is an Easter egg unless it appears many times in frames associated with the media asset.

In some embodiments, control circuitry 304 may compare the frequency to a threshold. Control circuitry 304 may retrieve the threshold from a database. The database may be local (e.g., at storage 308) or remote (e.g., at media guidance data source 418, accessed by way of communications network 414). Control circuitry 304 may determine, based on the comparison, whether the frequency is less than, matches, or exceeds the threshold.

In some embodiments, control circuitry 304 may determine, based on the comparing, that the frequency exceeds (or equals) the threshold. Based on determining that the frequency exceeds the threshold, control circuitry 304 may perform a search of a source external to a source of the media asset. For example, control circuitry 304 may perform a search of media content source 416. When control circuitry 304 performs the search, control circuitry 304 may search for an indication that the media object comprises an Easter egg. An indication may be any indication that confirms or indicates that the media object comprises an Easter egg. For example, control circuitry 304 may consult a database (e.g., media guidance data source 418) to determine whether a registry of Easter eggs refers to the media object. As an example, if such a registry names media object 502 as an Easter egg, then an indication will be found by way of the search. The indication may also be that a sufficient amount of social chatter on a social networking platform, such as Twitter or Facebook, mentions the media object. The indication may also be that a sufficient amount of websites, or a sufficient amount of subscribers to an online discussion forum such as Reddit, have mentioned the Easter egg. As an Example, for media object 504, control circuitry 304 may determine that the teddy bear is indicated in a registry of Easter eggs, or that users of the online discussion forum Reddit have indicated that the teddy bear is an Easter egg, or have sufficiently discussed the teddy bear such that control circuitry 304 determines on its own that the teddy bear is an Easter egg.

Additionally or alternatively, control circuitry 304 may take additional action in searching for an indication. As an example, control circuitry 304 may determine that the media object includes a telephone number, such as the telephone number on laundry ticket 502. Control circuitry 304 may automatically dial the telephone number and determine whether voice data received based on dialing the telephone number is consistent with a voice of a character in the media asset. For example, as depicted in FIG. 5, the phone number is from an episode of "Better Call Saul." Control circuitry 304 may determine whether, when dialing the telephone number, audio data that is consistent with a voice of a character in "Better Call Saul" such as Saul's voice. Based on determining that the voice data is consistent with the voice of the character in the media asset, control circuitry may determine that the indication was found.

In some embodiments, control circuitry 304 may determine whether, based on the performing of the search, the indication was found. As was described above, this may be done in any manner, such as control circuitry receiving a successful query, verifying a phone number, and the like.

In some embodiments, control circuitry 304 may, based on determining that the indication was found, execute a function relating to the Easter egg. For example, control circuitry 304 may generate for display (e.g., on display 312) a prompt that identifies the Easter egg to a viewer, such as prompt 506. Prompt 506 corresponds to the Easter egg being laundry ticket 502, and may alert the user to the fact that laundry ticket 502 contains an Easter egg, perhaps by stating "EASTER EGG ALERT: The phone number 505-503-4455 is a number you can dial in real life to reach Saul Goodman," as is depicted in FIG. 5. Control circuitry 304 may additional or alternatively generate for display an audio prompt (e.g., through speakers 314).

In some embodiments, when control circuitry 304 generates for display prompt 506, the prompt may comprise a selectable option for performing a further function, such as selectable option 508. For example, as is depicted in FIG. 5, selectable option 508 may offer to dial Saul Goodman for the user if the Easter egg is laundry ticket 502. Control circuitry may receive a selection of selectable option 508 by the user by way of user input interface 310. Other possible options of selectable options 508 include control circuitry 304 generating for display additional information about the Easter egg, generating for display a selectable shortcut that, when selected, causes a frame in which a second instance of the Easter egg appears to be generated for display, and the like.

In some embodiments, the Easter egg is a media object that has hidden meaning, where hidden meaning means having a meaning that is identified by means other than metadata embedded within the media asset or metadata obtained from a signal that provides the media asset. As an example, control circuitry 304 is able to ascertain that media object 502 or 504 is an Easter egg by way of information other than VBI information, or metadata embedded in the media asset. For example, with respect to media object 502, control circuitry 304 may dial the phone number embedded in media object 502 to determine whether media object 502 is an Easter egg, as is described above and below. Media object 504, which is a teddy bear, may be determined to be an Easter egg based on information such as the teddy bear recurring often at certain scenes, as may be discussed by users on a popular online discussion form, such as Reddit. It also may be determined to be an Easter egg based on its high frequency throughout several episodes of "Better Call Saul" and related series "Breaking Bad."

In some embodiments, the media object (e.g., media object 502 or 504) may comprise at least one of textual data in the frame (e.g., a telephone number such as that included in media object 502), a two-dimensional image in the frame (e.g., a laundry ticket such as media object 502), and a three-dimensional object in the frame (e.g., a stuffed animal, such as teddy bear 504).

In some embodiments, when control circuitry 304 is identifying the media object, control circuitry may execute an OCR module. For example, image data such as that displayed on user equipment 500 by display 312 is not easily deciphered. Control circuitry 304 may execute an OCR module to identify textual data, such as the telephone number, included within media object 502.

In some embodiments, the source external to the source of the media asset may comprise at least one of: an on-line discussion forum, a database comprising an identification of Easter eggs, and a voicemail provider. For example, control circuitry 304 may crawl an on-line discussion forum, such as Reddit, to determine whether media object 502 or 504 is sufficiently discussed. As another example, a database comprising an identification of Easter eggs, such as media guidance data source 418, may indicate whether media object 502 or 504 is an Easter egg. The voicemail provider example is described above, where control circuitry 304 may detect that media object 502 includes a phone number based on voice data comparison with a voicemail provider.

In some embodiments, when control circuitry 304 executes the function, control circuitry 304 may initiate a chat portal by which a viewer of the media asset may communicate with other users on the topic of the Easter egg. For example, control circuitry 304 may generate for display an overlay on top of a media asset displayed (e.g., on display 312, at prompt 506). The overlay may include a chat window where users who have identified an Easter egg, or who are interested in identifying the meaning of an Easter egg, may chat about it.

In some embodiments, control circuitry 304 may set the threshold based on at least one of: a length of the media asset, the number of other media assets associated with the media asset, and a type of the media asset. For example, if the media asset is a short media asset, a small threshold like one or two media objects may be a sufficiently high threshold, whereas if the media asset is a long media asset, control circuitry 304 may set a high threshold because an Easter egg is unlikely to be an Easter egg if it does not appear a relatively high number of times as compared to other objects in the media asset. As another example, if the media asset is part of a long series, like Breaking Bad, which has over fifty episodes, then control circuitry 304 may set a high threshold based on the number of media assets associated with the media asset. Whereas, if the media asset is a standalone movie, the frequency may be lower. Finally, control circuitry 304 may set the threshold based on the type of the media asset (again, a standalone movie versus a long series).

Figure 6:
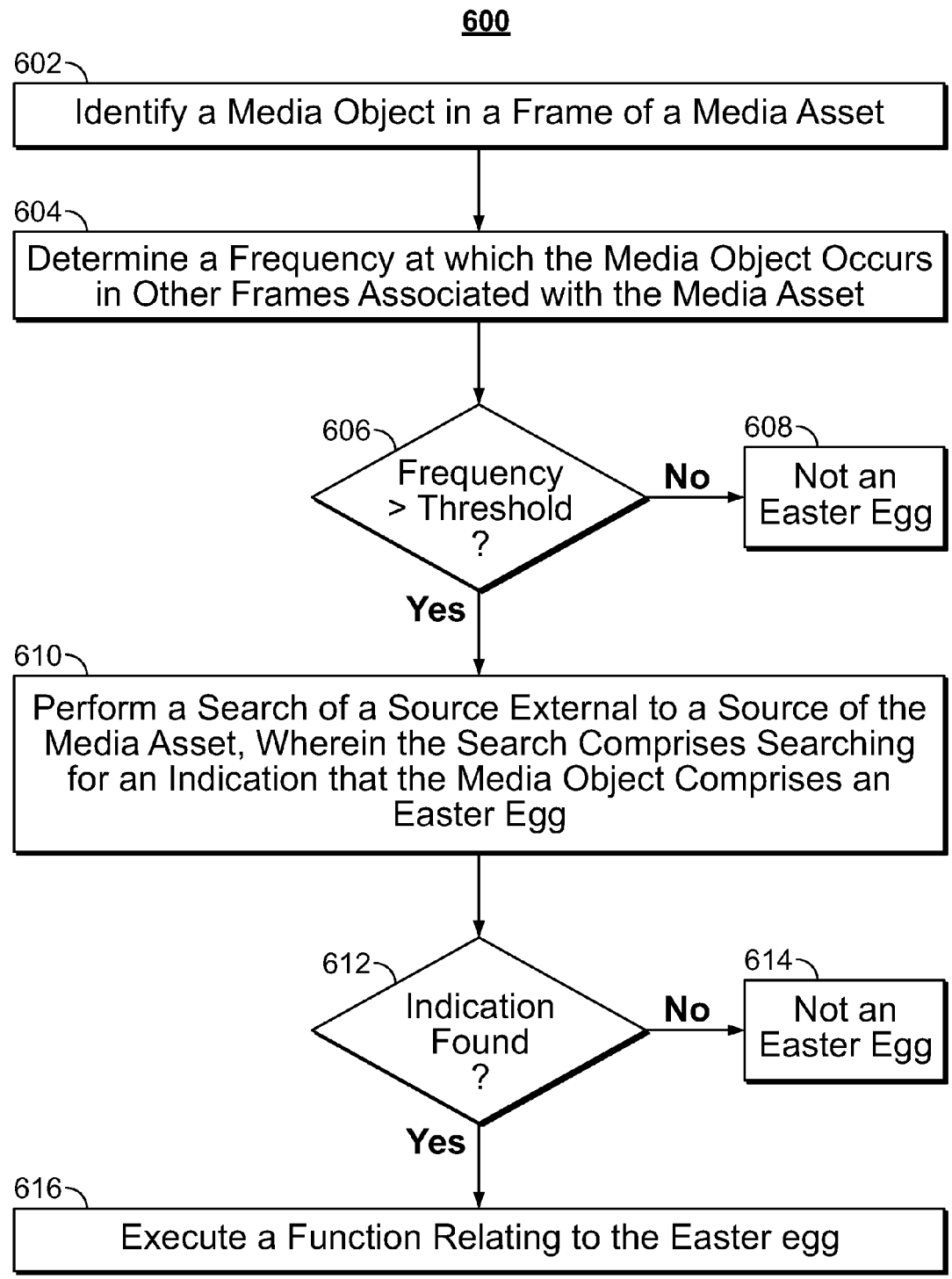
FIG. 6 is a flowchart of illustrative steps involved in determining which portion of an image to generate for display, in accordance with some embodiments of the disclosure.

FIG. 6 is a flowchart of illustrative steps involved in determining which portion of an image to generate for display, in accordance with some embodiments of the disclosure. It should be noted that process 600 or any step thereof could be performed on, or provided by, any of the devices shown in FIGS. 3-5. For example, process 600 may be executed by control circuitry 304 (FIG. 3) as instructed by control circuitry implemented on user equipment 402, 404, and/or 406 (FIG. 4) in order to determine whether a media object is an Easter egg. In addition, one or more steps of process 600 may be incorporated into or combined with one or more steps of any other process or embodiment.

Process 600 begins at 602, where control circuitry (e.g., control circuitry 304) may identify a media object (e.g., media object 502) in a frame of a media asset. For example, control circuitry 304 may use an OCR module to identify a telephone number in a media frame, such as a telephone number on Saul Goodman's laundry ticket, as depicted in FIG. 5.

Process 600 may then continue to 604, where control circuitry 304 may determine a frequency at which the media object occurs in other frames associated with the media asset. As an example, control circuitry 304 may query a database (e.g., media guidance data source 418) to determine how many other instances the media object occurs in either the same episode of "Better Call Saul," the entire series of "Better Call Saul," or the entire series of related media asset series, such as "Breaking Bad," from which "Better Call Saul" was spun off. If media guidance data source 418 is not available, control circuitry 304 may access each frame associated with the media asset and apply any known media object identification technique, such as analyzing metadata or employing an image recognition engine, to determine a frequency at which the media object appears in the frames associated with the media asset. As an example, a frequency may be low for certain objects, or even be set to 1 for objects that are highly likely to be Easter eggs, such as telephone numbers like the one in media object 502. The frequency may be high for more ubiquitous objects, such as stuffed animals like media object 504. It is unlikely that media object 504 is an Easter egg unless it appears many times in frames associated with the media asset.

Process 600 may then continue to 606, where control circuitry determines whether the frequency is greater than (or equal to) the threshold. This comparison may occur in any manner described above and below. If the frequency is not greater than (or equal to) the threshold, process 600 may continue to 608, where control circuitry 304 determines that the media object is not an Easter egg. If the frequency is greater than the threshold, process 600 may continue to 610.

At 610, control circuitry 304 may perform a search of a source external to a source of the media asset, where the search comprises searching for an indication that the media object comprises an Easter egg. For example, control circuitry 304 may perform a search of media content source 416. Process 600 may then continue to 612, where it is determined whether an indication is found. An indication may be any indication that confirms or indicates that the media object comprises an Easter egg. For example, control circuitry 304 may consult a database (e.g., media guidance data source 418) to determine whether a registry of Easter eggs refers to the media object. As an example, if such a registry names media object 502 as an Easter egg, then an indication will be found by way of the search. The indication may also be that a sufficient amount of social chatter on a social networking platform, such as Twitter or Facebook, mentions the media object. The indication may also be that a sufficient amount of websites, or a sufficient amount of subscribers to an online discussion forum such as Reddit, have mentioned the Easter egg. As an Example, for media object 504, control circuitry 304 may determine that the teddy bear is indicated in a registry of Easter eggs, or that users of the online discussion forum Reddit have indicated that the teddy bear is an Easter egg, or have sufficiently discussed the teddy bear such that control circuitry 304 determines on its own that the teddy bear is an Easter egg.

Additionally or alternatively, control circuitry 304 may take additional action in searching for an indication. As an example, control circuitry 304 may determine that the media object includes a telephone number, such as the telephone number on laundry ticket 502. Control circuitry 304 may automatically dial the telephone number and determine whether voice data received based on dialing the telephone number is consistent with a voice of a character in the media asset. For example, as depicted in FIG. 5, the phone number is from an episode of "Better Call Saul." Control circuitry 304 may determine whether, when dialing the telephone number, audio data that is consistent with a voice of a character in "Better Call Saul" such as Saul's voice. Based on determining that the voice data is consistent with the voice of the character in the media asset, control circuitry may determine that the indication was found.

If, at 612, an indication is not found, then process 600 may continue to 614, where control circuitry 304 may determine that the media object is not an Easter egg. If an indication is found, then process 600 may continue to 616, where control circuitry 304 may execute a function relating to the Easter egg. For example, control circuitry 304 may generate for display (e.g., on display 312) a prompt that identifies the Easter egg to a viewer, such as prompt 506. Prompt 506 corresponds to the Easter egg being laundry ticket 502, and may alert the user to the fact that laundry ticket 502 contains an Easter egg, perhaps by stating "EASTER EGG ALERT: The phone number 505-503-4455 is a number you can dial in real life to reach Saul Goodman," as is depicted in FIG. 5. Control circuitry 304 may additionally or alternatively generate for display an audio prompt (e.g., through speakers 314).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination of whether a media object is an Easter egg may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, a threshold as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for detecting and acting on Easter eggs hidden in a video asset, the method comprising:
   identifying a media object in a video frame of a video asset, wherein the media object corresponds to a string of characters representing a destination that is reachable by an electronic communication;
   determining a frequency at which the media object occurs in other video frames associated with the video asset;
   comparing the frequency to a threshold;
   determining, based on the comparing, that the frequency exceeds the threshold;
   in response to determining that the frequency exceeds the threshold, automatically performing a search of a source external to a source of the video asset, wherein the search comprises searching for an indication that the media object comprises an Easter egg, and wherein performing the search comprises:
      automatically accessing information stored at the destination based on the string of characters;
      automatically determining whether the information is consistent with an attribute of the video asset; and
      based on determining that the information is consistent with the attribute of the video asset, automatically determining that the indication was found; and
   based on determining that the indication was found, executing a function relating to the Easter egg.

2. The method of claim 1, wherein the Easter egg is a media object that has hidden meaning, and wherein having hidden meaning comprises having a meaning that is identified by means other than metadata embedded within the video asset or metadata obtained from a signal that provides the video asset.

3. The method of claim 1, wherein the string of characters comprises a telephone number.

4. The method of claim 1, wherein the identifying of the media object comprises executing an optical character recognition module to identify the string of characters in the video frame.

5. The method of claim 1, wherein the string of characters is a telephone number wherein automatically accessing information stored at the destination comprises automatically dialing the telephone number, wherein automatically determining whether the information is consistent with the attribute of the video asset comprises automatically determining whether voice data received based on dialing the telephone number is consistent with a voice of a character in the video asset and wherein the determination that the information is consistent with the attribute of the video asset further comprises a determination that the voice data is consistent with the voice of the character in the video asset.

6. The method of claim 1, wherein executing the function comprises generating for display a prompt that identifies the Easter egg to a viewer.

7. The method of claim 6, wherein the prompt comprises a selectable option for performing a further function, and wherein the further function comprises at least one of: dialing a telephone number, generating for display additional information about the Easter egg, and generating for display a selectable shortcut that, when selected, causes a video frame in which a second instance of the Easter egg appears to be generated for display.

8. The method of claim 1, wherein the source external to the source of the video asset comprises at least one of: an on-line discussion forum, a database comprising an identification of Easter eggs, and a voicemail provider.

9. The method of claim 1, wherein the executing of the function comprises initiating a chat portal by which a viewer of the video asset may communicate with other users on the topic of the Easter egg.

10. The method of claim 1, wherein the threshold is set based on at least one of: a length of the video asset, the number of other video assets associated with the video asset, and a type of the video asset.

11. A system for detecting and acting on Easter eggs hidden in a video asset, the method comprising:
  image processing circuitry; and
  control circuitry configured to:
    identify, using the image processing circuitry, a media object in a video frame of a video asset, wherein the media object corresponds to a string of characters representing a destination that is reachable by an electronic communication;
    determine a frequency at which the media object occurs in other video frames associated with the video asset;
    compare the frequency to a threshold;
    determine, based on the comparing, that the frequency exceeds the threshold;
    in response to determining that the frequency exceeds the threshold, automatically perform a search of a source external to a source of the video asset, wherein the search comprises searching for an indication that the media object comprises an Easter egg, and wherein performing the search comprises:
      automatically accessing information stored at the destination based on the string of characters;
      automatically determining whether the information is consistent with an attribute of the video asset; and
      based on determining that the information is consistent with the attribute of the video asset, automatically determining that the indication was found; and
    based on determining that the indication was found, execute a function relating to the Easter egg.

12. The system of claim 11, wherein the Easter egg is a media object that has hidden meaning, and wherein the control circuitry is further configured to determine whether the media object has hidden meaning by determining whether the media object has a meaning that is identified by means other than metadata embedded within the video asset or metadata obtained from a signal that provides the video asset.

13. The system of claim 11, wherein the string of characters comprises a telephone number.

14. The system of claim 11, wherein the control circuitry is further configured, when identifying of the media object, to execute an optical character recognition module to identify the string of characters in the video frame.

15. The system of claim 11, wherein the string of characters is a telephone number, wherein the control circuitry is further configured to automatically access information stored at the destination based on the string of characters by automatically dialing the telephone number, and automatically determine whether the information is consistent with the attribute of the video asset by determining whether voice data received based on dialing the telephone number is consistent with a voice of a character in the video asset, and wherein the determination that the information is consistent with the attribute of the video asset comprises a determination that the voice data is consistent with the voice of the character in the video asset.

16. The system of claim 11, wherein the control circuitry is further configured, when executing the function, to generate for display a prompt that identifies the Easter egg to a viewer.

17. The system of claim 16, wherein the prompt comprises a selectable option for performing a further function, and wherein the further function comprises at least one of: dialing a telephone number, generating for display additional information about the Easter egg, and generating for display a selectable shortcut that, when selected, causes a video frame in which a second instance of the Easter egg appears to be generated for display.

18. The system of claim 11, wherein the source external to the source of the video asset comprises at least one of: an on-line discussion forum, a database comprising an identification of Easter eggs, and a voicemail provider.

19. The system of claim 11, wherein the control circuitry is further configured, when executing of the function, to initiate a chat portal by which a viewer of the video asset may communicate with other users on the topic of the Easter egg.

20. The system of claim 11, wherein the threshold is set based on at least one of: a length of the video asset, the number of other video assets associated with the video asset, and a type of the video asset.

* * * * *